United States Patent [19]

Rado

[11] 4,442,075
[45] Apr. 10, 1984

[54] TITANIUM ORE CHLORINATION PROCESS USING A MOLTEN SALT

[75] Inventor: Theodore A. Rado, Oklahoma City, Okla.

[73] Assignee: Kerr-McGee Chemical Corporation, Oklahoma City, Okla.

[21] Appl. No.: 480,252

[22] Filed: Mar. 30, 1983

[51] Int. Cl.³ .............................................. C01G 23/02
[52] U.S. Cl. ........................................ 423/76; 423/77; 423/79; 423/DIG. 12
[58] Field of Search ............... 423/76, 77, 79, DIG. 12

[56] References Cited

U.S. PATENT DOCUMENTS

| | | | |
|---|---|---|---|
| 3,639,100 | 2/1972 | Rick | 423/DIG. 12 |
| 4,024,221 | 5/1977 | Becker et al. | 423/DIG. 12 |
| 4,039,647 | 8/1977 | Wohleber et al. | 423/DIG. 12 |
| 4,083,923 | 4/1978 | Tippman et al. | 423/DIG. 12 |
| 4,179,492 | 12/1979 | Kruesi | 423/DIG. 12 |
| 4,209,501 | 6/1980 | Kruesi | 423/DIG. 12 |

FOREIGN PATENT DOCUMENTS 161492  7/1964  U.S.S.R. ................................ 423/79

Primary Examiner—Herbert T. Carter
Attorney, Agent, or Firm—William G. Addison

[57] ABSTRACT

A process of chlorinating titanium ore suspended with carbonaceous reductant in molten salt by passage of chlorine therethrough. Titanium tetrachloride produced is purified of by-product metal chlorides by their absorption in the salt as non-volatile double salts.

8 Claims, 2 Drawing Figures 4,442,075

TITANIUM ORE CHLORINATION PROCESS USING A MOLTEN SALT

FIELD OF THE INVENTION

The invention relates generally to the field of titanium ore chlorination to produce titanium tetrachloride and more particularly, but not by way of limitation, to a chlorination process conducted in a molten salt chlorination zone.

SUMMARY OF THE INVENTION

Titanium tetrachloride is produced from natural or synthetic titanium ore, carbonaceous reductant and chlorine. A chlorination zone is produced by providing a first quantity of salt, melting at between about 600 degrees centigrade and about 900 degrees centigrade and about 800 degrees centigrade. The titanium ore and the reductant then are introduced into the chlorination zone to produce a loaded chlorination zone. Chlorine then is passed into the loaded chlorination zone to produce a first product stream comprising titanium tetrachloride and chlorination by-products.

DESCRIPTION OF THE PREFERRED EMBODIMENT

Titanium ores conventionally have been chlorinated in a fluid bed in the presence of coke. The chlorides of the impurities in the ore, primarily iron chloride, as well as titanium tetrachloride were condensed and collected, after which the titanium tetrachloride was purified. In this type of process, all of the impurities tended to be left in the titanium tetrachloride and it then was necessary to remove such impurities from the titanium tetrachloride. Further, the ore and coke tended to blow out of the chlorinator once the ore and coke reacted down to a relatively small size and this loss represented a significant economic penalty. Very fine ore could not be used in this particular process because it blew out of the chlorinator almost immediately after being passed into the chlorinator. Also, in this particular process, unreactive impurities tended to accummulate in the fluid bed and it was difficult and relatively expensive to remove such impurities from the fluid bed. The titanium ore chlorination process of the present invention is intended to provide a process for overcoming these disadvantages and, in the process of the present invention, the chlorination is conducted in a molten salt bath such that the ore and coke are suspended in the molten salt, through which chlorine is bubbled. Thus, in the process of the present invention, fine ore and coke can be used since the ore and coke cannot blow out from the molten salt and virtually a one hundred percent yield can be achieved. The impurities are trapped by the molten salt, thereby resulting in a more pure titanium tetrachloride leaving the chlorinator.

Figure 1:
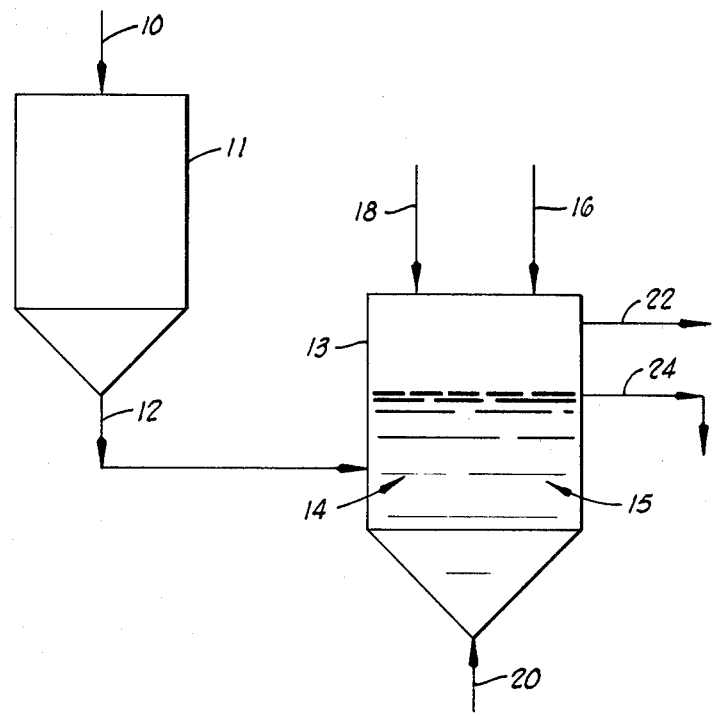
FIG. 1 is a schematic diagram of the flow of materials in an embodiment of the process of the present invention.

With reference to FIG. 1, the salt, melting at between about 600 degrees centigrade and about 900 degrees centigrade, preferably sodium chloride or potassium chloride or a mixture of sodium chloride and potassium chloride, or calcium chloride if the by-product salts are reclaimed for sale, is introduced via a conduit 10 into a melter 11 which is maintained at a temperature sufficient to melt the salt. The salt is reduced to a molten form in the melter 11 and the melter 11 thus provides a source of molten salt.

The molten salt is transferred or passed from the melter 11 via a conduit 12 to a chlorinator 13. In the chlorinator 13, the molten salt is maintained at a temperature between about 800 degrees centigrage and about 1000 degrees centigrade, and always above the melting point of the salt being utilized, to produce a chlorination zone 14 in the chlorinator 13. In some instances, the salt could be directly introduced into the chlorinator 13 where the salt would be melted to form the chlorination zone 14, thereby eliminating the need for the melter 11.

Titanium ore, natural or synthetic and in one embodiment in a finely divided form, is introduced via a conduit 16 into the chlorination zone 14 in the chlorinator 13. A carbonaceous reductant, preferably coke and, in one embodiment, coke in a finely divided form, is introduced into the chlorination zone 14 via a conduit 18. The titanium ore and carbonaceous reductant may be premixed and added to the chlorinator 13 through a single conduit if desired in some applications. In either event, an ore to reductant ratio of between about 6 to 10 and about 6.5 to about 7.0 preferably is maintained.

The ore and reductant are suspended in the molten salt in the chlorination zone 14 to produce a loaded chlorination zone 15 which is maintained in the temperature range mentioned before with respect to the chlorinator 13. The molten salt content of the loaded chlorination zone 15 preferably is maintained in the range of about 80 weight percent to about 90 weight percent.

Chlorine gas then is passed into the loaded chlorination zone 15 via a conduit 20. As the chlorine permeates the loaded chlorination zone 15, a chlorination reaction occurs producing a first product stream comprising titanium tetrachloride which flows from the chlorinator 13 via a conduit 22. The first product stream usually contains chlorination by-products such as carbon dioxide, carbon monoxide and volatile chlorides of such metals as tin, silicon and iron, for example.

Figure 2:
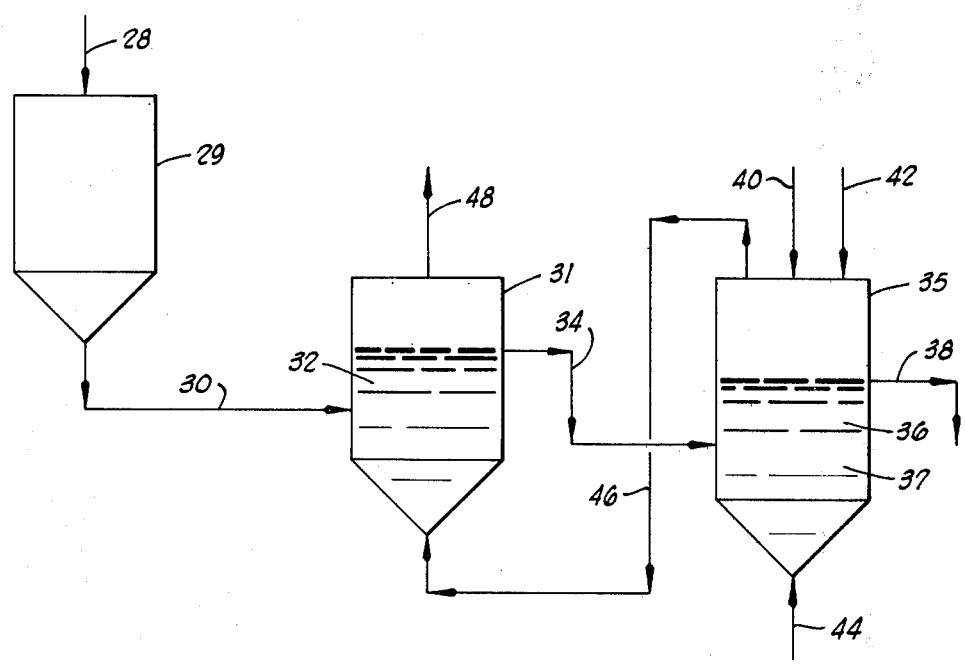
FIG. 2 is a schematic diagram of the flow of materials in another embodiment of the process of the present invention.

A second quantity of salt in molten form, having properties substantially the same as salt in the chlorination zone 14, may be provided to produce a scrubbing zone 32 as shown in FIG. 2, in a manner to be described below. The first product stream may be passed into the scrubbing zone 32 to produce a second product stream comprising purified titanium tetrachloride.

For continual operation, a flow of molten salt as well as ore and reductant may be continued into the loaded chlorinator during passage of chlorine therethrough. A chlorination zone overflow from the loaded chlorination zone 15 is withdrawn from the chlorinator via a conduit 24. This overflow contains chlorination by-products such as double salts of sodium chloride in combination with ferric chloride, and may be further processed or discarded as waste.

Referring to FIG. 2, salt is introduced into a melter 29 via a conduit 28. The melter 29 is maintained at a temperature above the melting point of the salt and is a source of molten salt for subsequent operations.

For purposes of clarity, the flow of molten salt first will be described alone and then in combination with the chlorination process. Molten salt passes from the melter 29 via a conduit 30 to the scrubber 31 where the molten salt forms a scrubbing zone 32 in the scrubber 31. Overflow from the scrubbing zone 32 passes via a conduit 34 to the chlorinator 35 where such overflow forms a chlorination zone 36 in the chlorinator 35, the overflow being passed from the scrubber 31 at a predetermined level in the scrubber 31. Overflow from the chlorination zone 36 passes from the chlorinator 35 via a conduit 38, the overflow being passed from the chlorinator 35 at a predetermined level in the chlorinator 35.

In the chlorination zone 36, a first quantity of salt, preferably comprising sodium chloride (and desirably some portion of another salt so as to reduce the melting point) and melting at between about 600 degrees centigrade and about 900 degrees centigrade, is maintained in a molten form at a temperature between about 800 degrees centigrade and about 1000 degrees centigrade.

Synthetic or natural titanium ore, such as ilmenite, is introduced into the chlorination zone 36 of the chlorinator 35 via a conduit 40. The ore in one embodiment is in a finely divided form to facilitate suspension in the molten salt. A carbonaceous reductant, preferably coke, is introduced into the chlorination zone 36 of the chlorinator 35 via a conduit 42 to form a loaded chlorination zone 37. The reductant also in one embodiment is in a finely divided form. The ore and reductant also may be premixed and added to the chlorinator 35 via a single conduit, if desired in a particular application. In either event, an ore to reductant ratio of between about 6 to 10 and about 6.5 to 7.0 preferably is maintained in the chlorinator 35.

The ore and reductant are suspended in the molten salt of the chlorinator zone 36 which is maintained at the temperatures mentioned before. The molten salt content of the loaded chlorination zone 37 is maintained about 80 weight percent to about 90 weight percent.

Chlorine gas then is passed via a conduit 44 into the loaded chlorination zone 37. The chlorine gas preferably bubbles through the loaded chlorination zone 37 in small bubbles.

A first product stream, comprising titanium tetrachloride and chlorination by-products, is produced by chlorination and is transferred via a conduit 46 to the scrubber 31. The scrubber 31 contains a second quantity of molten salt to form the scrubbing zone 32. The second quantity of salt is molten and has substantially the same characteristics as the first quantity of salt maintained in molten form in the chlorination zone 36.

The first product stream preferably is bubbled through the scrubbing zone 32 and certain chlorination by-products, such as ferric chloride, are absorbed by the molten salt to produce a second product stream comprising purified titanium tetrachloride which passes from the scrubber 31 via a conduit 48. The second product stream may be further processed or used as a final product.

While the chlorination and scrubbing are being carried out as described, the flow of molten salt simultaneously is proceeding as described before from the melter 29 to the scrubber 31 and then to the chlorinator 35. During the scrubbing of the first product stream in the scrubbing zone 32 in the scrubber 31, some chlorination by-products are absorbed, possibly as non-volatile double salts, and passed to the chlorination zone 36 of the chlorinator 35 with the scrubbing zone 32 overflow. In the loaded chlorination zone 37, similar chlorination by-products are produced and some are absorbed in the molten salt to pass with the chlorinator zone 36 overflow for disposal as waste or for further processing.

The salt preferably used throughout the processes shown in FIGS. 1 and 2 essentially is sodium chloride, potassium chloride or mixtures thereof. These particular salts are preferred because of their ability to form non-volatile double salts with certain non-titanium volatile metallic chlorides. Other salts having this capacity or even lacking this capacity could also be used in the processes of this invention, if they have appropriate melting and boiling points.

The preferred embodiments of the present invention offer numerous advantages over prior titanium ore chlorination methods. One particular advantage is the efficient usage of fine ore and reductant particles. Such fine particles are retained in molten salt suspension and not readily lost with the passage of gases therethrough. Fine particles characteristically have a high surface to volume ratio, permitting more complete interactions and contact with chlorine. These qualities permit a high yield of titanium tetrachloride to be obtained.

A further particular advantage, mentioned earlier, is the formation of non-volatile double salts from, for example, the volatile ore chlorination by-product ferric chloride and sodium chloride. Such double salt formation permits production of a gaseous titanium tetrachloride in a more pure form than has been accomplished for the most part with other methods. This particular advantage also leads to a more ready removal of by-products from the chlorination zone. Additionally, dissolution of by-products in molten salts leads to similar advantages.

The temperatures utilized in the chlorination and scrubbing zones produce a heated product stream potentially directly useful for subsequent heat-requiring processes.

Changes may be made in the construction, operation and arrangement of the various parts and elements described herein or in the steps or in the sequence of steps described herein without departing from the concept and scope of the invention as defined in the following claims.

What is claimed is:

1. A process for producing titanium tetrachloride from natural or synthetic titanium ore, carbonaceous reductant and chlorine, comprising the steps of:

providing a first quantity of salt, melting at between about 600 degress centigrade and about 900 degrees centigrade, in molten form having a temperature between about 800 degrees centigrade and about 1000 degrees centigrade to produce a chlorination zone;

introducing the titanium ore and the reductant into the chlorination zone to produce a loaded chlorination zone, the titanium ore and reductant essentially being suspended in the first quantity of salt in the molten form;

passing chlorine into the loaded chlorination zone to produce a first product stream comprising titanium tetrachloride, the first quantity of salt in the molten form cooperating to retain relatively fine particles of titanium ore or reductant or combinations thereof thereby permitting the use of smaller sizes of titanium ore or reductant or combinations thereof and the first quantity of salt in the molten form cooperating to form double salts in the loaded chlorination zone and to retain a substantial portion of some impurities for reducing the impurities in the first product stream; and passing the first product stream from the loaded chlorination zone.

2. The process of claim 1 wherein the step of providing the first quantity of salt is defined further to include the steps of:

providing a source of the salt in the molten form; and passing the molten salt from the source into a chlorinator for producing the chlorination zone in the chlorinator.

3. The process of claim 1 defined further to include the step of:

passing the reacted molten salt, titanium ore and reductant from the chlorination zone at a predetermined level for producing a chlorination zone overflow comprising chlorination by-products.

4. The process of claim 1 defined further to include the steps of:

providing a second quantity of the salt in molten form to produce a scrubbing zone; and passing the first product stream into the scrubbing zone to produce a second product stream comprising purified titanium tetrachloride.

5. The process of claim 4 wherein the steps of providing the first and second quantity of salt are defined further to include the steps of:

providing a source of molten salt;

passing the molten salt from the source into the scrubbing zone; and passing the molten salt from the scrubbing zone into the chlorination zone.

6. The process of claim 1 wherein the salt is defined further as comprising one of sodium chloride, potassium chloride and a mixture of sodium chloride and potassium chloride, or calcium chloride if the by-product salts are reclaimed for sale.

7. The process of claim 1 wherein the carbonaceous reductant is defined further as being coke.

8. The process of claim 1 wherein the titanium ore is defined further as being ilmenite.

* * * * *